United States Patent [19]
Morris

[11] Patent Number: 4,889,167
[45] Date of Patent: Dec. 26, 1989

[54] PIPE REPAIR DEVICE

[76] Inventor: Sheldon A. Morris, 27 Pamaron Way, Novato, Calif. 94949

[21] Appl. No.: 249,604

[22] Filed: Sep. 26, 1988

[51] Int. Cl.$^4$ .............................................. F16L 55/16
[52] U.S. Cl. ..................................... 138/99; 138/110; 24/279
[58] Field of Search .................... 138/99, 97, 110, 156, 138/167, 158, 159, 98; 24/279, 280, 281, 282

[56] References Cited

U.S. PATENT DOCUMENTS

| | | | |
|---|---|---|---|
| 1,736,630 | 11/1929 | Scharpenberg | 138/99 |
| 4,365,393 | 12/1982 | Hauffe et al. | 138/99 |
| 4,381,020 | 4/1983 | Daghe et al. | 138/99 |
| 4,409,708 | 10/1983 | Hauffe | 138/99 |
| 4,413,388 | 11/1983 | Akhtar-Khavari et al. | 138/99 |
| 4,606,377 | 8/1986 | Montgomery | 138/99 |
| 4,630,647 | 12/1986 | Thomson | 138/99 |
| 4,676,275 | 6/1987 | Hancock et al. | 138/99 |

*Primary Examiner*—James E. Bryant, III
*Attorney, Agent, or Firm*—Flehr, Hohbach, Test, Albritton & Herbert

[57] ABSTRACT

A pipe repair device is disclosed which provides a flexible elongate band for encircling the outer diameter of a portion of a pipe or other cylindrical conduit to be repaired. The band is comprised of two components, namely an elastomeric component of an elastomeric material and a tensile component comprised of a material having a high tensile strength and a high modulus of elasticity. Both components are joined at a base end which is connected to a lug assembly having a one-way lock device. The two components of the band extend from the base end along a free end in a loop which encircles the pipe and runs through a slot in the lock device. The lock device captures the band with the tensile component under sufficient tension for compressing the elastomeric component against the pipe to create the fluid-tight seal.

21 Claims, 2 Drawing Sheets

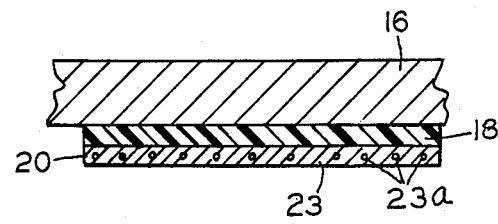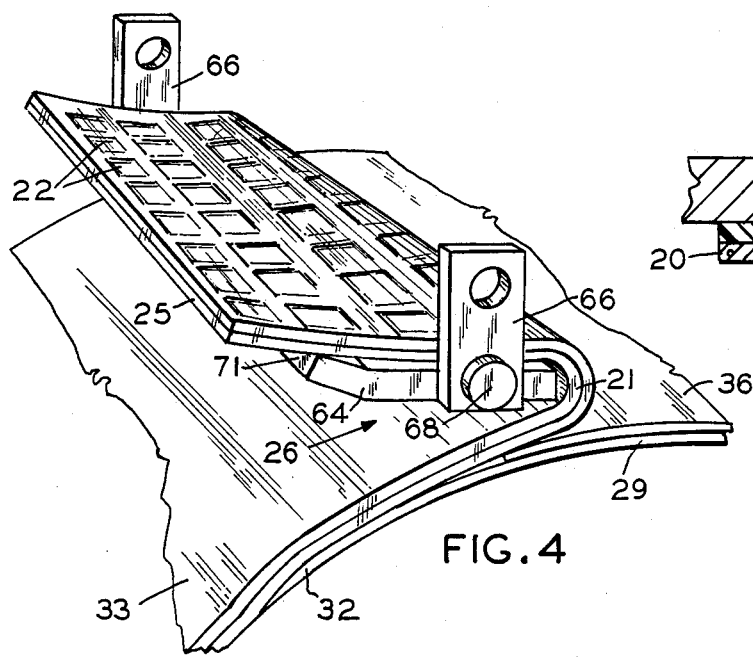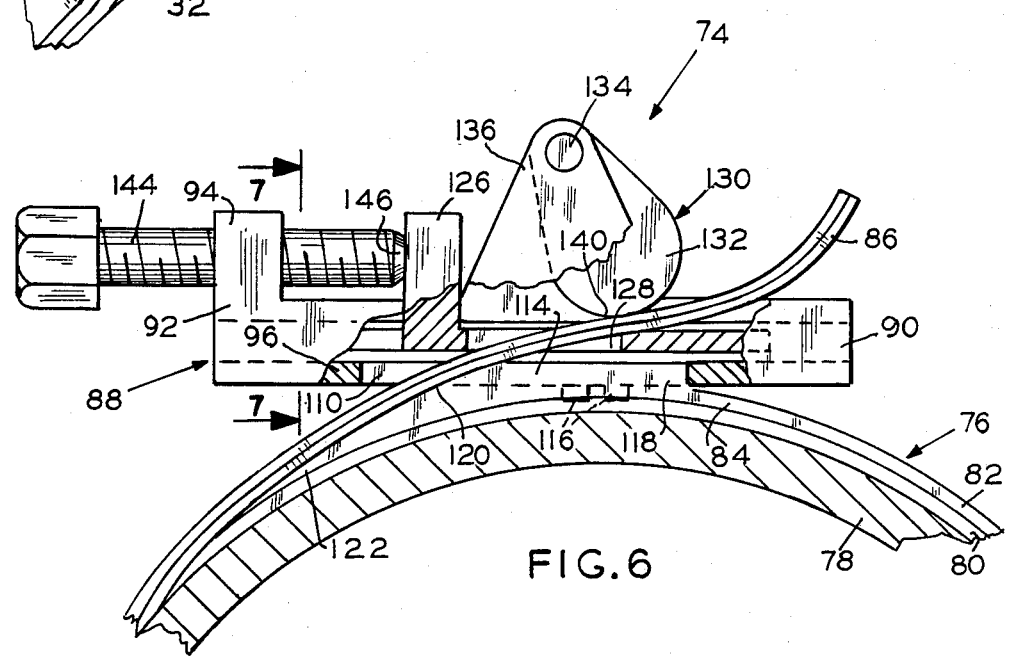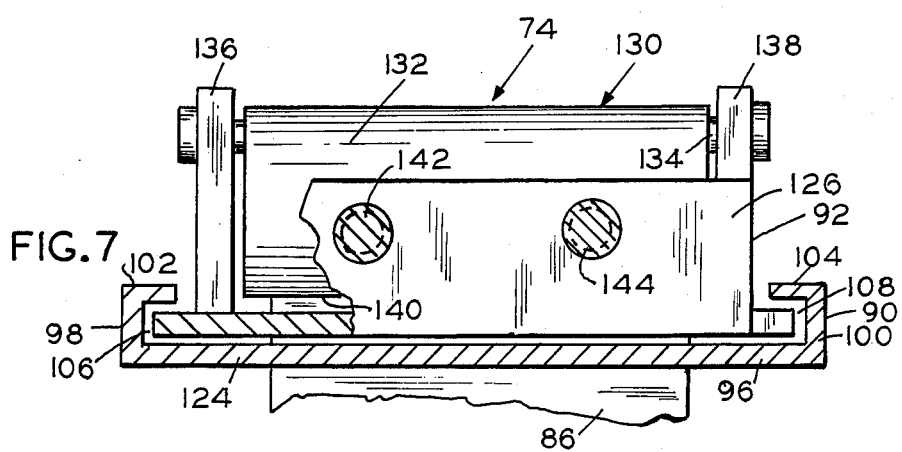

PIPE REPAIR DEVICE

This invention relates in general to devices for repairing leaks in pipes or other cylindrical conduits. In particular, the invention relates to devices for the in situ repair of pipes in which a compressible gasket is clamped about the portion of the pipe to be repaired.

A number of different types of pipe clamps have heretofore been available for the in situ repair of leaks in pipes and other cylindrical conduits. Among these devices are the type of pipe clamps in which a gasket layer is compressed about the pipe by a high-tensile strength malleable metal band which is tensioned by a bolt and lug assembly. These previously-known pipe clamps, however, generally have only a limited range of accommodation for dimensional variation from the nominal pipe size. As a result conventional pipe repair clamps are sized to fit a relatively narrow range of pipe sizes such that an inventory of a large number of different size clamps is required for meeting the repair requirements of a system having disparate pipe sizes, such as the water distribution system of a municipality. Maintaining such a large inventory of different size pipe clamps is inefficient and costly.

Previous attempts to provide a pipe clamp design for accommodating a larger range of pipe size have met with limited success. For example, the pipe clamp design in U.S. Pat. No. 3,848,638 provides a double set of lugs with a spanner bar for tensioning a malleable metal band and gasket about the pipe. Such a design, however, is adaptable only for use with a relatively modest range of pipe sizes and does not have universal application for fitting the entire gamut of pipe sizes encountered in the field.

Another expedient which has been used to accommodate a wider range of fit is that of a split metal band secured about the pipe by dual lug assemblies mounted at 180° positions. However, such dual lug assemblies have a number of disadvantages and limitations. For example, they are heavier and costlier than single lug assemblies, and the 180° displacement of the assemblies makes installation more difficult because it prevents top access for the repair of underground pipes. It is more desirable to have top access to the lug assemblies for installing pipe clamps in excavations of buried pipe, which is where leaks are typically encountered in the field.

It is, accordingly, a principal object of the present invention to provide a new and improved pipe repair device which obviates the disadvantage of conventional pipe repair clamps that are adapted to fit only a relatively narrow range of pipe sizes.

Another object of the invention is to provide a pipe repair clamp of universal design adapted to readily fit a broad range of pipe sizes.

Another object of the invention is to provide a pipe repair clamp of the type described which fits a wide range of pipe sizes and which also can have only a single lug assembly which facilitates top access for ease of installation in the excavation of an underground pipe.

Another object is to provide a pipe repair clamp of the type described in which the member which compresses the gasket about the pipe is formed of a high tensile strength flexible band configured in a loop sized as required by the pipe and which is then locked while in tension to hold the gasket compressed in fluid-tight sealing contact against the pipe surface.

Another object is to provide a pipe repair clamp of the type described in which pipes of a wide range of size are encircled by a high tensile strength flexible band having a free end which runs through an eccentric cam device for locking the band in a loop under tension to compress an elastomeric gasket against the outer surface of the pipe.

The pipe repair clamp of the invention in summary comprises a flexible elongate band together with tensioning means which secures the band in a loop about the area of the pipe to be repaired. The band is comprised of an elastomeric component and a tensile component. The two components are joined at their base end and extend together along a free end through the slot of an eccentric cam device. The eccentric cam locks against a portion of the free end of the band while the tensile component is in tension for compressing the elastomeric component into a fluid-tight seal against the outer surface of the pipe.

The foregoing and additional objects and features of the invention will become apparent from the following description in which the preferred embodiment has been set forth in detail in conjunction with the accompanying drawings.

FIG. 4 is a perspective view to an enlarged scale showing another component portion of the repair clamp of FIG. 1.

FIG. 5 is a cross-sectional view taken along the line 5—5 of FIG. 2.

FIG. 6 is a side view, partially broken away, of a pipe repair clamp incorporating another embodiment of the invention.

FIG. 7 is a cross-sectional view, partially broken away, taken along the line 7—7 of FIG. 6.

Figure 1:
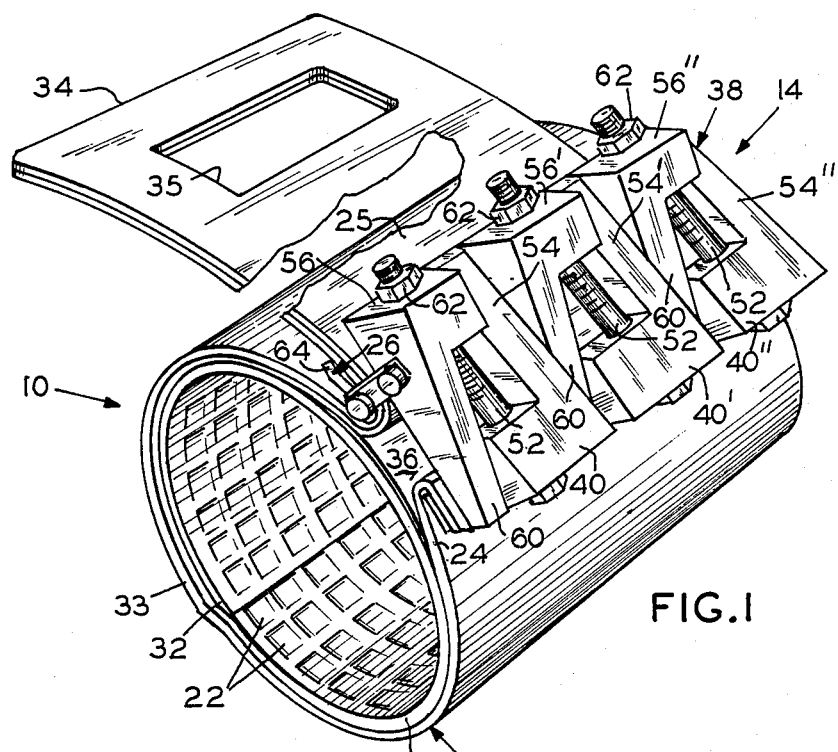
FIG. 1 is a perspective view of a pipe repair clamp incorporating a preferred embodiment of the invention.
Figure 2:
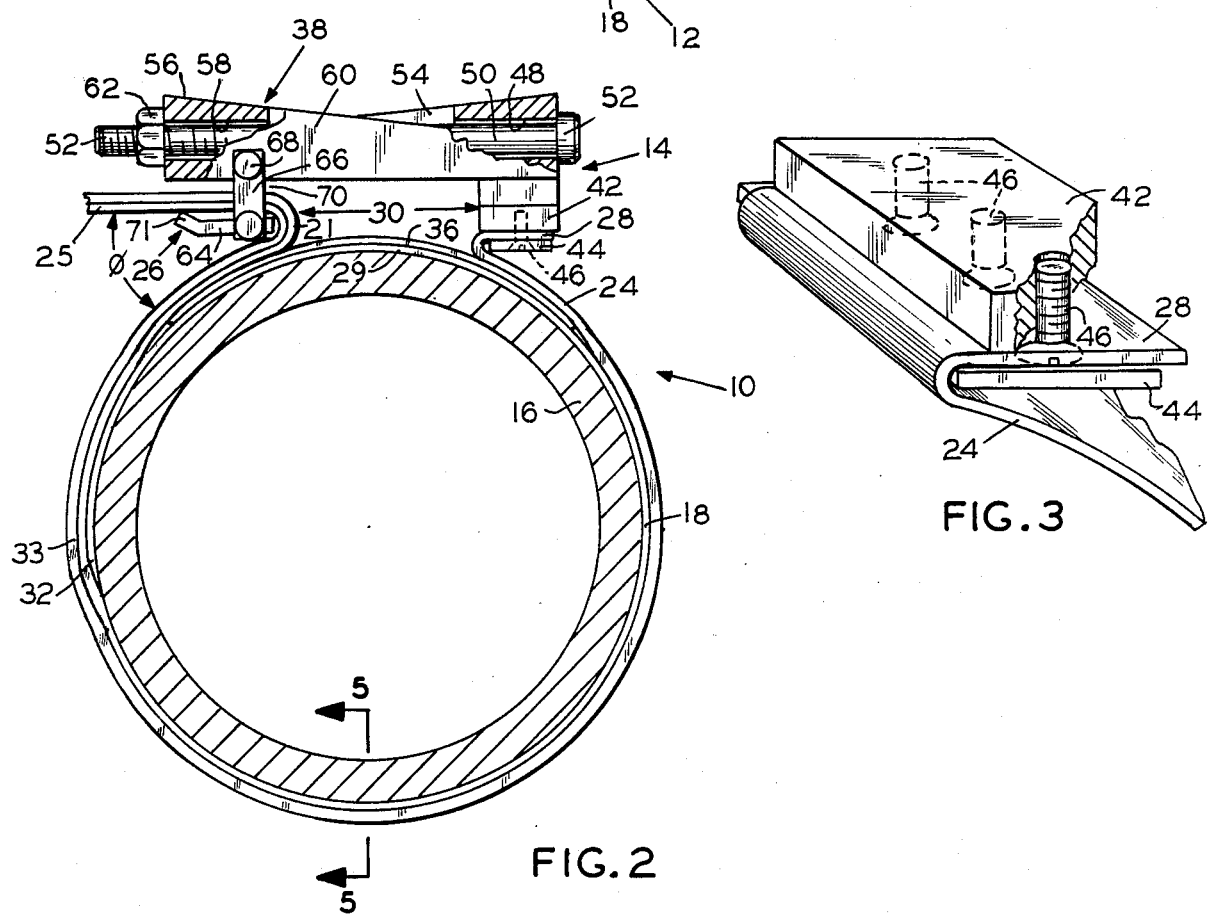
FIG. 2 is a lateral cross sectional view to an enlarged scale of the repair clamp of FIG. 1 shown installed about a pipe.

In the drawings FIGS. 1 and 2 illustrate generally at 10 a pipe repair device 10 according to a preferred embodiment of the invention. Pipe repair device 10 is comprised of a flexible elongate band 12 together with tensioning means 14 for locking the band in a loop under tension about a pipe 16 or other conduit which is to be repaired. Typically device 10 is employed to repair a leak or fracture in underground cast iron pipes or other conduits. Piping in the water systems of municipalities is an example of the field of use of the present invention.

Flexible band 12 is comprised of an elastomeric component 18 and a tensile component 20. Elastomeric component 18 is formed of an elastomeric material which yieldably compresses to form a fluid-tight seal with the pipe surface, and a natural or synthetic rubber gasket material is suitable for this purpose. The elastomeric component preferably is in the range of 50–60 durometer hardness to provide the desired range of flexibility and compressibility. The surface of the elastomeric component facing the pipe is preferably molded with a large plurality of shallow depressions 22 arranged in a waffle pattern as shown in FIG. 4 for increasing the gasket's barrier to fluid leakage.

Tensile component 20 is comprised of a flexible material having a relatively high tensile strength of a magnitude sufficient to sustain the tension force for compressing the inner layer. The tensile component also has a relatively high modulus of elasticity of a sufficient magnitude to permit the band to be bent back upon itself to form a bight 21 which defines an acute angle $\phi$ in the manner of a flexible belt. The acute angle $\phi$ will vary depending on the OD size of the particular pipe to which device 10 is fitted.

In the illustrated embodiment tensile component 20 is shown as comprised of an outer layer which overlies and is bonded to an inner layer which comprises the elastomeric component. The material for the outer layer of the tensile component is comprised of a scrim or weave 23a of fibers or cord encased or sandwiched, as shown in FIG. 5, within a ply 23 of an elastomer such as natural or synthetic rubbers. The tensile strength of component 20 is comparable to that of the malleable metal bands employed for conventional pipe repair clamps, which typically are of stainless steel gauge stock. A tensile strength of at least 85,000 lb/in$^2$ is optimum, and the tensile strength could vary from this depending on the requirements of a particular application. Thus, higher tensile strengths can be employed for use with large diameter pipes. The tensile component could also be comprised of a plurality of scrim in multiple layers for greater strength. The invention also contemplates that the tensile component could be one or more sheets of a high strength membrane such as Mylar, which is a trademark for polyethylene terephthalate.

Among the sandwich materials which are suitable to form tensile component 20 are corded tire material having either steel inserted or Kevlar inserted cords. Kevlar is a trademark for an aromatic amide fiber having high specific tensile strength and high impact strength. One specific example suitable for the tensile component is a Kevlar tire cord comprised of three woven strands of 15 denier weight material. The density of such strands or cords, and the diameters of the individual strands or cords, will depend upon the requirements and specifications of a particular application. For example, a greater cord density and diameter would be appropriate for the repair of larger size pipes where relatively large tension forces in the tensile component are required to adequately compress the elastomeric component. Other sandwich materials suitable for use to form the tensile component include cloth-inserted natural or synthetic rubbers, fiberglass weave-inserted sandwiches, nylon cord inserted sandwiches and other synthetic and natural fibers having comparable properties of high tensile strength and high modulus of elasticity sandwiched within a suitable flexible elastomer.

While in the illustrated embodiment the tensile component and elastomeric component are shown in separate layers, the invention also contemplates that the tensile component could be embedded within the elastomeric component; for example the two components could be molded together. The invention also contemplates that the tensile component could comprise a scrim, strands or membrane of the high tensile strength material which extend flat along the outer surface of a layer of the elastomeric component.

The inner elastomeric component and outer tensile component of the band 12 extend from a base end 24 which is attached at one side to tensioning means 14 and continues along the loop about the pipe to the opposite side. The free end 25 of the band is folded back upon itself at bight 21 and runs through a one-way lock device 26 which provides means for locking the band in tension about the pipe. At base end 24 the two components are separated with the tensile component folding back to form an attachment lip 28. The underlying portion 29 of the elastomeric component bridges across the gap 30 which is formed between base end 24 and bight 21. This portion 29 terminates at a tapered end 32 which is wedged between the pipe surface and the overlying portion 33 of the band to ensure that the seal is effective for the full 360° circumference of the pipe.

The portions of the inner and outer components along the length of the band from the free end up to the point at which the layers separate at the base end are secured together by suitable means such as heat fusion or adhesive bonding. The length of the free end from the base is sized according to the desired range of pipe sizes for which the clamp is intended for use. For example, where the intended use is for pipes having nominal ODs up to 14" then a length of 5' for the free end permits universal application within that pipe size range. This overall 5' length is sufficient to accommodate dimension pipe size variations and also provides a distal tail end 34 beyond the lock device of approximately 10" length when used to repair the 14" nominal pipe size. For very large size pipes multiple belts and lug assemblies could be connected in tandem around the pipe.

At tail end 34 of the band a generally rectangular slot 35 can optionally be provided for a hand grip. The workman can use this slot to pull the band through lock device 26 to a hand-tight tension as a part of the initial installation procedure, as explained in more detail below.

An arcuate rigid armor plate 36, preferably formed of a high-strength metal such as stainless steel, is secured by means such as adhesive bonding to the top surface of the portion 29 of the elastomeric component which spans gap 30 between the base end and bight. Armor plate 36 is sized to have a length along the circumference of the pipe sufficient so that the side edges of the plate are wedged between the tensile and elastomeric components at opposite ends of the gap. The band 12 when it is under tension applies compressive forces against the armor plate which in turn compresses the underlying portion of elastomeric component 18 against the pipe surface.

Figure 3:
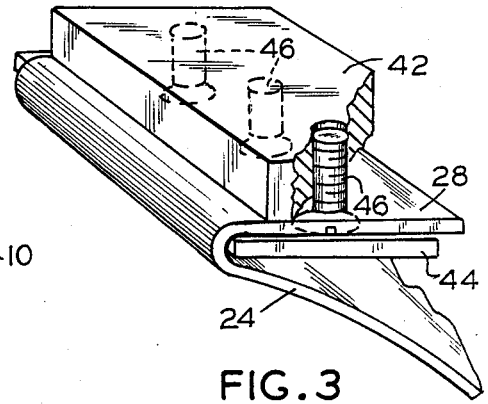
FIG. 3 is a perspective view to an enlarged scale showing a component portion of the repair clamp of FIG. 1.

Tensioning means 14 forms a link between the base end and bight and includes a lug assembly 38 which carries the one-way lock device 26. As best shown in FIGS. 1 and 2 assembly 38 comprises a plurality, shown as three, of metal lugs 40, 40' and 40" mounted in parallel relationship on a crossbar 42 by means such as welding or casting. The attachment lip 28 at the base end of the band is mounted to the crossbar by a flat plate 44 which is secured below the lip and crossbar by threaded fasteners 46, as best shown in FIG. 3. The top portion of each lug above the crossbar is formed with a barrel-shaped, smooth bore 48 adapted to slidably receive the shank 50 of a respective tightening bolt 52. The bolts function as operating means for applying or releasing tension in the band. Tapered tines 54, 54' and 54" extend from the barrel of each lug and bridge across gap 30. At the opposite side of the gap above bight 21 a second set of metal lugs 56, 56' and 56", comparable in number to the number of opposing lugs 40, are positioned in parallel relationship and secured together by means such as by welding. Each of the lugs is formed with a barrel-shaped, smooth bore 58 into which the threaded end of a respective bolt 52 is slidably received. The lugs 56 are formed with tapered tines 60 which bridge across the gap and fit in side-by-side relationship with the tines 54 of the corresponding lugs on the opposite side. Nuts 62 mounted onto the distal ends of the bolts are threaded down against the flat end faces of lugs 56 for drawing the opposing sets of lugs together to apply the tension forces in band 12.

The one-way lock means 26 comprises a transversely extending cam plate 64 mounted in spaced relationship below lug assembly 38 by a pair of downwardly extending arms 66 pivotally mounted by pins 68 to the opposite sides of lugs 56. The lateral sides of cam plate 64 are pivotally mounted to the arms at an axis which is eccentric of the transverse centerline of the plate in a direction toward the bight 21. The free end 25 of the band which bends back at bight 21 runs through a slot 70 formed between the cam plate and lug assembly, and the length of tail end 34 which extends beyond the cam plate is dependent upon the diameter of the particular pipe to which device 10 is fitted. The points of attachment of arms 66 to the cam plate are offset toward bight 21 so that the resulting eccentric mounting provides for unimpeded one-way movement of the band in a direction away from the lug assembly, which is to the left as viewed in FIG. 2. When the bolts are tightened the eccentric mounting arrangement causes the outer end 71 of the cam plate to tilt such that its inner end engages the adjacent surface of the band, thereby preventing retrograde movement of the band. The band is thereby locked with respect to the lug assembly as long as the tension forces are maintained. By loosening nuts 62 the tensioning means releases the band for disassembly or adjustment, as desired.

Another embodiment of the invention illustrated in FIGS. 6 and 7 provides a pipe repair device 74 having a flexible elongate band 76 which completely encircles the outer diameter of a pipe 78 and which eliminates the need for a rigid armor plate such as the plate 36 in the embodiment of FIGS. 1–5. The band 76 is comprised of an elastomeric component 80 and a tensile component 82. The two components extend from a base end 84 in a loop around the pipe with a free end 86 trained up through tensioning means 88. The elastomeric component and tensile component are formed of materials having the properties described for the respective elastomeric and tensile components of the embodiment of FIGS. 1–5 such that the elastomeric component yieldably compresses to form a fluid-tight seal about the pipe surface while tensile component is under a high tension force. The tensile component is illustrated as comprising an outer layer which overlies and is bonded to an inner layer of the elastomeric component, although the invention also contemplates that the tensile component could be embedded within the elastomeric component. Also the tensile component could comprise a scrim, strands or membrane of the high tensile strength material which extends flat along the outer surface of a layer of the elastomeric component.

Tensioning means 88 comprises a bolt block 90 upon which a trundle 92 is mounted for back-and-forth movement in a direction along the length of the band. The bolt block has an upstanding end wall 94, a bottom wall 96 and a pair of side walls 98,100 which project upwardly along the edges of the bottom wall. Intrusive lips 102,104 extend inwardly from the upper edges of the side walls to define channels 106,108 which guide the trundle along its path of movement.

A slot 110 is formed at the forward end of block bottom wall 96 for slidably receiving free end 86 of the band. At the opposite side of the slot the bottom wall is relieved along its sides to form a central support 114, and a pair of anchor ribs 116 project downwardly from the central support. The bolt block is attached to the band by molding and adhesively bonding an enlarged portion 118 of base end 84 about central support 114 and anchor ribs 116. The forward end of enlarged portion 118 is beveled at 120 to smoothly merge with a tapered end 122 of the band that is wedged between and compressed by the portion of free end 86 which completes the loop and thence is trained upwardly through slot 110 in the bolt block.

Trundle 92 is comprised of a flat base 124 and an upstanding end wall 126 which faces end wall 94 of the bolt block. The opposite sides of the trundle base project into the respective side channels 106,108 of the bolt block. A slot 128 is formed in trundle base 124 for slidably receiving band free end 86.

Lock means 130 is provided for releasably locking band free end 86 to the trundle and comprises a one-way cam lock 132. The cam lock is oval-shaped and is eccentricly mounted at its upper end on an axle 134. The ends of the axle are mounted at the upper ends of a pair of triangular support arms 136,138 which extend upwardly from the sides of trundle base 124. Cam lock 132 is sized with a width commensurate with the width of band 76 and with a radius from the axle sufficiently long so that cam lower end 140 engages the upper surface of the band when the latter overlies the upper surface of the trundle base. When the trundle is moved in a direction from left-to-right as viewed in FIG. 6 the lower end of the eccentric cam while it is engaged with the band pinches downwardly against the band due to the eccentric mounting of the cam. The band is thereby locked between the cam and trundle base in the manner illustrated in FIG. 6.

Operating means is provided to establish a compression force between block end wall 94 and trundle end wall 126 in a direction which urges the trundle from left to right as viewed in FIG. 6. The operating means comprises a pair of bolts 142,144 which are mounted through threaded holes formed in block end wall 94. The distal ends 146 of the two bolts press against the outer face of trundle end wall 126 so that when the bolts are turned inwardly the bolt distal ends, which are under compression, urge trundle end wall 124 in the direction from left to right which causes the cam lock to engage with the band. Further tightening of the bolts increases the compression force against the trundle which acts through the cam lock to apply the tension force in the band to the desired level at which the elastomeric component is sufficiently compressed against the pipe to effect the desired sealing.

The use and operation of the invention will be explained in relation to the embodiment of FIGS. 1–5. The area of pipe to be repaired, such as a broken or punctured wall of underground pipe, is first prepared by excavating around the pipe. Using pipe repair device 10 lug assembly 38 is set up with the nuts loosely threaded onto the bolts and with the free end of band 12 pulled out completely from slot 70 of lock device 26. The workman loops the free end of the band around the pipe and draws it up and through slot 70. Using hand grip slot 35 in the end of the band the workman pulls the band through the lock device to a hand-tight tension. As the workman releases the band eccentric cam 64 engages and initially locks the band against retro displacement. The nuts are then turned down on the bolts and tightened to draw the opposing lugs toward each other. This tensions the portion of the band which loops around the pipe and compresses elastomeric component 18 into a fluid-tight seal with the pipe's outer surface. Installation of the pipe clamp is thereby completed, and the excavation around the pipe can then be filled in.

While the foregoing embodiments are at present considered to be preferred it is understood that numerous variations and modifications may be made therein by those skilled in the art and it is intended to cover in the appended claims all such variations and modifications as fall within the true spirit and scope of the invention.

I claim:

1. A device for repairing leaks in a pipe or other cylindrical conduit comprising the combination of a flexible elongate band having a base end and a free end, said free end having a loop which at least partially encircles the outer diameter of a portion of the pipe and a distal portion projecting outwardly from the loop, said band comprised of an elastomeric component which yieldably compresses to form a fluid-tight seal with the underlying surface of the pipe and a tensile component which extends longitudinally with respect to the band and which has a tensile strength in an effective amount to sustain a tension force for compressing the elastomeric component to maintain said fluid-tight seal, said tensile component having a modulus of elasticity in an effective amount by which said distal portion is folded outwardly and back at an acute angle bight, and tensioning means for drawing the base end and bight of the band together to apply a tension force along the loop about the pipe and compress the elastomeric component against the underlying surface of the pipe to form said fluid-tight seal, said bight comprising said elastomeric and tensile components.

2. A device as in claim 1 in which the elastomeric component is bonded with the tensile component along at least a portion of the band extending from the base end along the length of the free end.

3. A device as in claim 1 in which the band bifurcates at its base end into a portion which includes a terminal end of the tensile component connected with the tensioning means and another portion which includes a terminal portion of the elastomeric component which bridges between the base end and bight and is in contact with the pipe surface.

4. A pipe repair device as in claim 1 in which the tensile component is comprised of a material having a tensile strength along its length of at least 85,000 lb/in$^2$.

5. A pipe repair device as in claim 1 in which the tensile component is comprised of a membrane.

6. A pipe repair device as in claim 1 in which the tensioning means comprises lock means for locking a portion of the free end of the band to hold the portion of the band forming the loop in tension for compressing said elastomeric component against the surface of the pipe.

7. A pipe repair device as in claim 6 in which the tensioning means includes a lug assembly for forming a link between said base end and the bight, and said lock means includes a cam together with means for mounting the cam spaced from the lug assembly to form a slot therebetween with said free end of the band at the end of the loop bending back upon itself at the bight and running through the slot between the cam and lug assembly.

8. A pipe repair device as in claim 6 in which the tensioning means further comprises a lug assembly having a first lug connected with the base end of the band and a second lug spaced apart from the first lug across a gap, said lock means being carried by the second lug, and operating means for moving the first and second lug together along the gap while said lock means is engaged with the band whereby the portion of the band forming the loop is drawn into tension.

9. A pipe repair device as in claim 8 which includes means for mounting the cam in spaced relationship from the second lug means to form a slot therebetween with the free end of the band bending back upon itself at said bight and running through said slot between the cam and second lug means.

10. A pipe repair device as in claim 6 in which said tensioning means is releasable for selectively disengaging said band.

11. A pipe repair device as in claim 1 in which said elastomeric component and tensile component are mounted together along the loop from the base end to at least said bight with said base end and bight being separated by a gap at a side of the loop, said elastomeric component including a portion which extends from the base end and bridges across the gap, and further including an arcuate rigid plate mounted above and in contact with said portion of the elastomeric component which bridges across the gap with a portion of the band at the base end overlying one side margin of the plate and with a portion of the band at the bight overlying the opposite side margin of the plate whereby with said tension applied along the loop the base end and bight compress the plate against the underlying portion of the elastomeric component which in turn is compressed against the underlying surface of the pipe.

12. A pipe repair device as in claim 1 which includes a hand grip slot in the distal end of the band for use in manually pulling the band to a hand-tight tension while said tensioning means is operated.

13. A pipe repair device as in claim 1 in which the tensioning means comprises a bolt block secured to the base end of the band, lock means for releasably locking said distal portion, and operating means for applying a compression force between the bolt block and lock means to urge said distal portion of the band while engaged by said lock means in a direction which pulls the band in tension along the loop about the pipe.

14. A pipe repair device as in claim 13 in which the operating means comprises at least one bolt for applying compression force therebetween.

15. A pipe repair device as in claim 13 in which the bolt block includes a bottom wall anchored to said base end of the band and a first slot in said bottom wall with said distal portion of the band extending from the loop through the first slot, said lock means being carried by the bolt block above the base for releasably locking with the distal portion of the band responsive to said compression force being applied by the operating means.

16. A pipe repair device as in claim 15 in which said lock means comprises cam means for engaging the portion of the band distal portion which extends through the first slot when said compression force is applied to maintain said tension force in the portion of the band encircling the pipe.

17. A device for repairing leaks in a pipe or other cylindrical conduit comprising the combination of a flexible elongate band having a base end and a free end, said free end having a loop which at least partially encircles the outer diameter of a portion of the pipe and a distal portion projecting outwardly from the loop, said band comprised of an elastomeric component which yieldably compresses to form a fluid-tight seal with the underlying surface of the pipe and a tensile component which extends longitudinally with respect to the band and which has a tensile strength in an effective amount to sustain a tension force for compressing the elastomeric component to maintain said fluid-tight seal, said tensile component being comprised of a plurality of tensioning strands arrayed in a scrim, said tensile component having a modulus of elasticity in an effective amount by which said distal portion is folded outwardly and back to form an acute angle bight, and tensioning means for drawing the base end and bight of the band together to apply a tension force along the loop about the pipe and compress the elastomeric component against the underlying surface of the pipe to form said fluid-tight seal.

18. A pipe repair device as in claim 17 in which the tensioning strands are selected from the group consisting of steel cord, aromatic amide fiber cord, fiberglass, nylon, rayon, synthetic fiber and natural fiber.

19. A pipe repair device as in claim 17 in which the strands are at least of 15 denier weight.

20. A device for repairing leaks in a pipe or other cylindrical conduit comprising the combination of a flexible elongate band having a base end and a free end, said free end having a loop which at least partially encircles the outer diameter of a portion of the pipe and a distal portion projecting outwardly from the loop, said band comprised of an elastomeric component which yieldably compresses to form a fluid-tight seal with the underlying surface of the pipe and a tensile component which extends longitudinally with respect to the band and which has a tensile strength in an effective amount to sustain a tension force for compressing the elastomeric component to maintain said fluid-tight seal, said tensile component having a modulus of elasticity in an effective amount by which said distal portion is folded outwardly and back to form an acute angle bight, and tensioning means for drawing the base end and bight of the band together to apply a tension force along the loop about the pipe, said tensioning means comprising lock means for locking the distal portion of the free end of the band to hold the portion of the band forming the loop in tension for compressing said elastomeric component against the surface of the pipe, said tensioning means including a lug assembly linking said base end with the bight, and said lock means including a cam together with means for mounting the cam spaced from the lug assembly to form a slot therebetween with said free end of the band at the end of the loop bending back upon itself at the bight and running through the slot between the cam plate and lug assembly, said means for mounting the cam carries the cam for pivotal movement about a transverse axis located eccentric of the transverse center axis of the cam and in a direction toward the bight whereby the free end of the loop is lockably engaged by the cam when said tension is applied to the band.

21. A device for repairing leaks in a pipe or other cylindrical conduit comprising the combination of a flexible elongate band having a base end and a free end, said free end having a loop which at least partially encircles the outer diameter of a portion of the pipe and a distal portion projecting outwardly from the loop, said band comprised of an elastomeric component which yieldably compresses to form a fluid-tight seal with the underlying surface of the pipe and a tensile component which extends longitudinally with respect to the band and which has a tensile strength in an effective amount to sustain a tension force for compressing the elastomeric component to maintain said fluid-tight seal, said tensile component having a modulus of elasticity in an effective amount by which said distal portion is folded outwardly and back to form an acute angle bight, and tensioning means for drawing the base end and bight of the band together to apply a tension force along the loop about the pipe and compress the elastomeric component against the underlying surface of the pipe to form said fluid-tight seal, in which the tensioning means comprises a bolt block secured to the base end of the band, lock means for releasably locking said distal portion, and operating means for applying a compression force between the bolt block and lock means to urge said distal portion of the band while engaged by said lock means in a direction which pulls the band in tension along the loop about the pipe, said operating means comprising bolt means for applying said compression force between the bolt block and lock means, in which the bolt block includes a bottom wall anchored to said base end of the band and a first slot in said bottom wall with said distal portion of the band extending from the loop through the first slot, said lock means being carried by the bolt block above the base for releasably locking with the distal portion of the band responsive to said compression force being applied by the operating means, said lock means comprising cam means for engaging the portion of the band distal portion which extends through the first slot when said compression force is applied to maintain said tension force in the portion of the band encircling the pipe, said lock means including a trundle mounted for movement on the bolt block in said direction, said cam means being carried by the trundle, and a second slot in the trundle with the distal portion of the band which extends through the first slot of the base thence extending through the second slot of the trundle for engagement with the cam means.

* * * * *